(12) United States Patent
Cohen (10) Patent No.: US 10,876,721 B1
(45) Date of Patent: Dec. 29, 2020

(54) LIGHTING ASSEMBLY WITH JUNCTION BOX SUPPORT

(71) Applicant: Brandon Cohen, Vernon, CA (US)

(72) Inventor: Brandon Cohen, Vernon, CA (US)

( * ) Notice: Subject to any disclaimer, the term of this patent is extended or adjusted under 35 U.S.C. 154(b) by 0 days.

(21) Appl. No.: 16/417,546

(22) Filed: May 20, 2019

Related U.S. Application Data

(63) Continuation of application No. 15/464,009, filed on Mar. 20, 2017, now Pat. No. 10,295,163, and a continuation of application No. 29/597,785, filed on Mar. 20, 2017.

(51) Int. Cl.
| | | |
|---|---|---|
| *F21V 21/04* | (2006.01) | |
| *F21V 23/02* | (2006.01) | |
| *F21V 19/00* | (2006.01) | |
| *F21S 8/02* | (2006.01) | |
| *F21Y 115/10* | (2016.01) | |

(52) U.S. Cl.
CPC ............ *F21V 23/02* (2013.01); *F21S 8/026* (2013.01); *F21V 19/0015* (2013.01); *F21V 21/047* (2013.01); *F21Y 2115/10* (2016.08)

(58) Field of Classification Search
CPC ........ H02G 3/085; H02G 3/125; F21V 21/04; F21V 21/042; F21V 21/048
See application file for complete search history.

(56) References Cited

U.S. PATENT DOCUMENTS

| | | | |
|---|---|---|---|
| 1,133,535 A | 3/1915 | Cain | |
| 1,471,340 A | 10/1923 | Knight | |
| 1,856,356 A | 5/1932 | Owen | |
| 2,352,913 A * | 7/1944 | Parker | H01R 24/76 174/53 |
| 2,758,810 A * | 8/1956 | Good | H02G 3/126 248/343 |
| 2,802,933 A | 8/1957 | Broadwin | |
| 3,104,087 A | 9/1963 | Budnick | |
| 3,773,968 A | 11/1973 | Copp | |
| 3,913,773 A * | 10/1975 | Copp | H02G 3/085 220/3.92 |
| 4,880,128 A | 11/1989 | Jorgensen | |
| 4,919,292 A | 4/1990 | Hsu | |
| 5,303,894 A | 4/1994 | Deschamps | |
| 5,420,376 A * | 5/1995 | Rajecki | H02G 3/20 174/484 |
| 5,957,573 A | 9/1999 | Wedekind | |
| 6,521,833 B1 * | 2/2003 | DeFreitas | F16L 25/0045 174/50 |
| 6,967,284 B1 * | 11/2005 | Gretz | H02G 3/125 174/50 |
| 7,784,754 B2 | 8/2010 | Meyers | |
| 7,857,275 B2 | 12/2010 | de la Borbolla | |

(Continued)

*Primary Examiner* — Ismael Negron (74) *Attorney, Agent, or Firm* — Eric Kelly (57) ABSTRACT

A light housing assembly includes: (1) a junction box unit having a body with a partially-cylindrical sidewall, a closed end, and a circular opening opposite the closed end, and flat inset facets on the sidewall with knock-out holes formed on the flat inset facets; (2) a light emitter housing containing a light source; and (3) an exterior surface fixture, with a reflector, including means for securing the light emitter housing to the junction box unit. Versions of the light housing assembly may include a mounting bracket assembly for mounting the junction box unit to supportive structure.

22 Claims, 7 Drawing Sheets

(56) References Cited

U.S. PATENT DOCUMENTS

| | | | |
|---|---|---|---|
| 7,950,832 B2 | 5/2011 | Tanaka | |
| 3,235,549 A1 | 8/2012 | Gingrich, III | |
| 8,926,133 B2 | 1/2015 | Booth | |
| 9,151,457 B2 * | 10/2015 | Pickard | F21S 8/026 |
| 9,605,842 B1 | 3/2017 | Davis | |
| 9,696,021 B2 * | 7/2017 | Wronski | F21V 21/22 |
| 9,797,562 B2 * | 10/2017 | Dabiet | F21S 8/02 |
| 9,964,266 B2 * | 5/2018 | Danesh | F21V 7/041 |
| D832,218 S | 10/2018 | Wronski | |
| D833,977 S | 11/2018 | Danesh | |
| 10,139,059 B2 * | 11/2018 | Danesh | F21S 8/02 |
| D848,375 S | 5/2019 | Danesh | |
| 10,295,163 B1 * | 5/2019 | Cohen | F21S 8/026 |
| D851,046 S | 6/2019 | Peng | |
| 10,408,396 B2 | 9/2019 | Wronski | |
| D864,877 S | 10/2019 | Danesh | |
| 2015/0233556 A1 | 8/2015 | Danesh | |
| 2016/0348861 A1 | 12/2016 | Bailey | |
| 2017/0138576 A1 * | 5/2017 | Peng | F21S 8/02 |
| 2017/0167672 A1 | 6/2017 | Stauner | |
| 2017/0167699 A1 | 6/2017 | Schubert | |
| 2019/0063701 A1 | 2/2019 | Loth | |

\* cited by examiner

LIGHTING ASSEMBLY WITH JUNCTION BOX SUPPORT

FIELD OF THE INVENTION

The invention relates to electrical junction lighting boxes in particular of the type for recessed ceiling lights.

BACKGROUND

The manufacture and installation of recessed lighting is complicated by the required adherence to building codes and regulations. In the past, the combination of a recessed ceiling lighting housing—or "can"—and a separate recessed fire-rated drywall box was required when installing an overhead light fixture in order to create a space between the can and surrounding insulation. The purpose of the space is to prevent fire hazard such as in the event of an electrical failure. The can held the lighting fixture, while the surrounding drywall box provided the required space to prevent fire hazards in the event of an electrical failure. This combination was necessarily accompanied by at least one separate junction box, in which through-branch wiring connections were routed for each overhead downlight connected in the circuit.

Recently, compact junction lighting boxes have been developed that retain the combination of a fire-rated recessed lighting fixture, while also allowing the wiring connections afforded by traditionally-separate junction boxes. This combination junction lighting box provides both the lighting housing and the electrical junction box requirements in a single unit. Importantly, the new combination junction lighting boxes provide fire-rated protection, without the need for the creation of a separate fire-rated drywall cavity surrounding the can that houses the lighting element. When used in conjunction with light emitting diode (LED) lighting, in which heat production and overall lighting module size are reduced, the new combination box provides a multitude of advantages over traditional downlight fixtures and circuits.

BRIEF DESCRIPTION OF THE DRAWINGS

The embodiments of the invention are illustrated by way of example and not by way of limitation, in which like references indicate similar elements. It should be noted that references to "an' or "one" embodiment of the invention in this disclosure are not necessarily to the same embodiment.

DETAILED DESCRIPTION

The present invention is in the realization that a circular open bottom of a junction lighting box can be accompanied by one or more flat inset facets for presenting one or more knock-outs and leaving a flat opening on removal of the one or more knock-outs for fitting a conventional conduit fitting thereby allowing through-branch wiring connections into the junction lighting box through the opening formed by removal of the knock-outs and installation of the conduit fitting. This is done by providing the junction lighting box in fully cylindrical form in a lower portion and an upper portion having the cylindrical form interrupted by one or more flat inset facets having the knock-out on the flat surface. In one embodiment, the upper portion is configured in pentagonal peripheral portions and in which alternate ones of the pentagonal peripheral portions the cylindrical shape is interrupted by the flat inset facets thereby giving four flat inset facets each separated by a cylindrical portion which extends as a continuation of the cylindrical form of the lower portion. In another embodiment, all eight of the octagonal peripheral portions are formed as flat inset facets (which may be referred to simply as facets) thereby allowing a knock-out in each one if desired, although the knock-outs could still be only in alternate ones of the facets. Another embodiment specifies that in the foregoing first embodiment at least a pair of the cylindrical upper portions which are on opposite sides of the junction lighting box each having a vertical slot for carrying a bracket and mounted on the bracket is a telescoping sliding rail as more fully described below. Yet a variation of that embodiment is applied to the embodiment having all of the octagonal peripheral portions being flat inset facets and having the pair of opposing vertical slots in opposing facets and similarly having a bracket for sliding and being fixed at a location on the slot length which is more fully described below.

Each of the embodiments of the present invention remedies the difficulty and time delay presented by the requirement for making an octagonal opening for the prior art combination junction box, and eliminates the need for a customized lighting element or fixture that fits the unique octagonal shape. A circular opening is much easier to cut into a surface, as it would not require extensive preparation or measurements taken during the cutting process, but instead only requires the use of a hand or press drill equipped with an appropriately-sized circular saw-bit. However, a fully cylindrical junction lighting box—with a circular cross-section to match the circular surface cutout—would not include properly-shaped knock-outs used for branch-through wiring.

FIGS. 1-8 show an embodiment of a cylindrical junction lighting box unit 112. The cylindrical junction lighting box unit 112 fits into a circular surface cutout 118 (FIG. 17), and includes a cylindrical body 120 that incorporates four flat inset facets 122 each into the cylindrical form providing a substantially flat surface on which to form knock-out holes 124. Each of the flat inset facets occupies an octagonal peripheral portion P/8 of the periphery of the body 120. These are shown as the periphery designated as P/8 meaning a ⅛th peripheral portion of the body 120. The flat inset facets 122 extend from the top of the cylindrical junction lighting box unit axially downward to a termination a selected distance from the top thereby defining a length dimension L of the flat inset facets. At their bottom, the flat inset facets end, in the illustrated embodiment by a transition from the flat inset surface to the curved outer diameter of the cylindrical body 120 at a sloped indentation 126, and are each adjacent to a curved segment 180. In the embodiment shown there are four such flat inset facets each occupying a P/8 peripheral portion and equally spaced apart by a peripheral portion P/8 around the body 120 so as to define eight octagonal peripheral spaces. Therefore, the junction lighting box is seen as being cylindrical from its circular open bottom to its closed top except that in an upper portion, there are defined octagonal peripheral portions around the periphery and the flat inset facets each occupying an octagonal peripheral portion P/8 alternate with extended cylindrical octagonal peripheral portions P/8 in the shape of the upper portion. A pair of bracket positioning slots 128 are cut into the cylindrical body 120 on directly opposing curved segments 180, which affords access to an interior cylindrical cavity 130 and allows mounting and positioning of brackets as described below (see e.g., sliding box bracket 154 in FIG. 19). The cylindrical junction lighting box unit 112 terminates at one end in a circular notched edge 132, and in a closed top 178 at the other end. In an alternative embodiment, the body 120 includes a non-notched circular edge (not shown) that is, the notch is omitted. The box unit 112 is formed from cast aluminum, but may alternatively be formed from any other fire-rated durable polymer or metallic substance. In an alternative embodiment, the facets 122 do not extend from a midpoint on the cylindrical body 120 to the closed end 178, but are present surrounding the axial midpoint of the cylindrical body 120. Each such alternative middle face would incorporate an upper sloped indentation (not shown) in addition to the previously-described lower sloped indentation 126. The result of this alternative embodiment would be a junction lighting box unit (not shown) having both top and bottom circular cross-sections.

Figure 1:
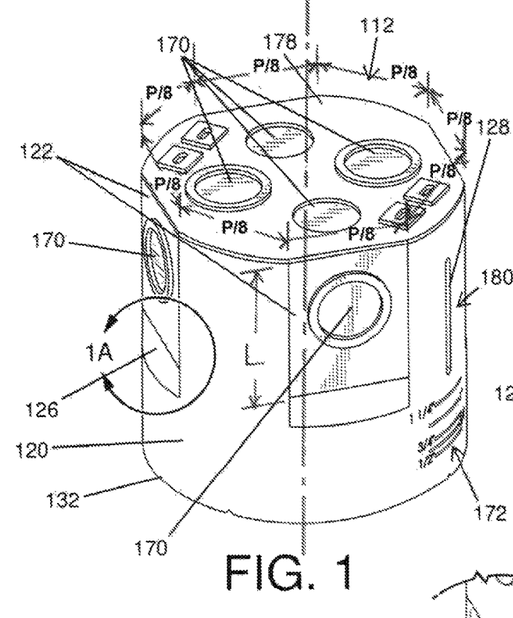
FIG. 1 shows a top perspective view of a partially-faceted junction box, according to one embodiment.
Figures 1A, 3, 4:
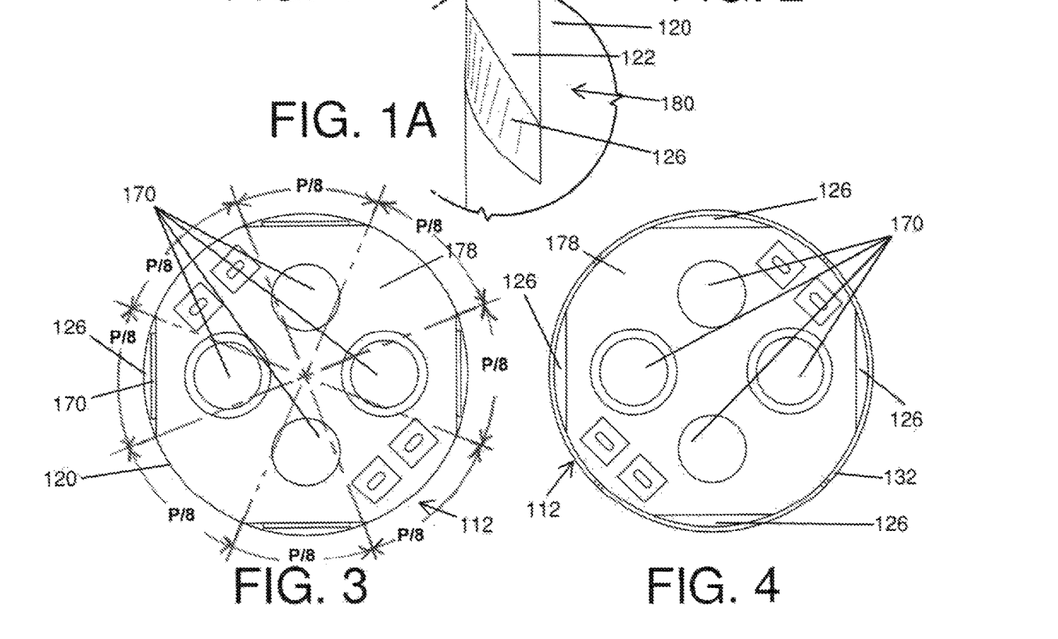
FIG. 1A shows a close-up perspective view of the selection 1A shown in FIG. 1.
FIG. 3 shows a top view of the box of FIG. 1.
FIG. 4 shows a bottom view of the box of FIG. 1.
Figure 2:
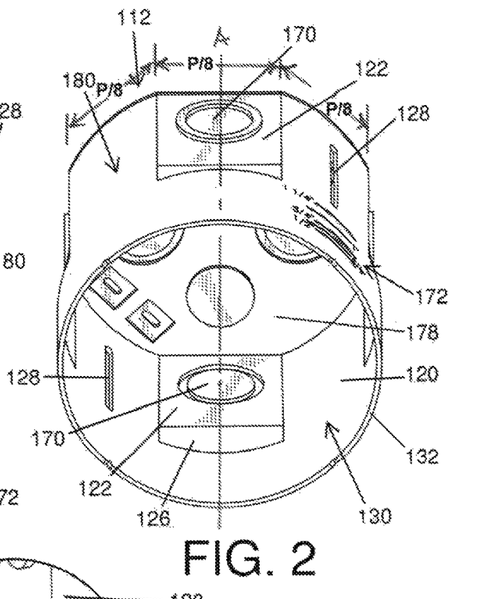
FIG. 2 shows a bottom perspective view of the box of FIG. 1.
Figures 5, 6:
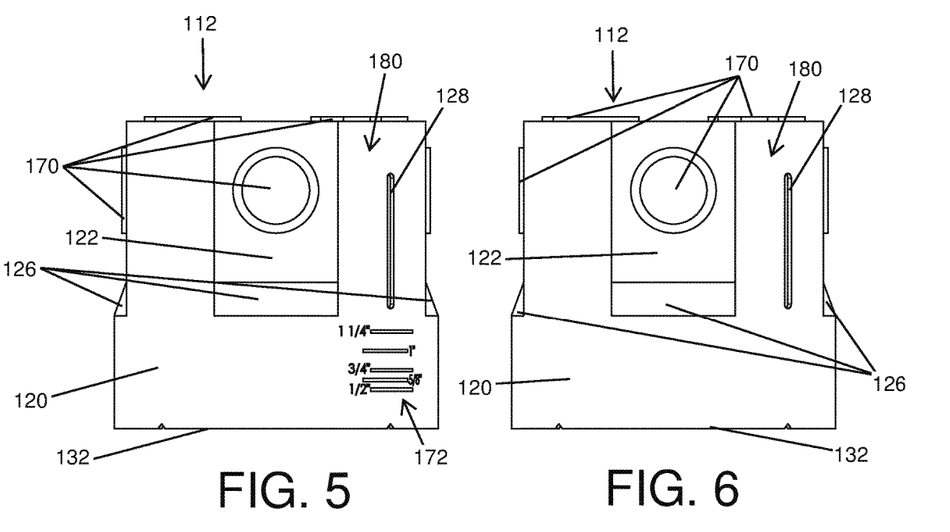
FIG. 5 shows a front view of the box of FIG. 1.
FIG. 6 shows a rear side view of the box of FIG. 1.
Figures 7, 8:
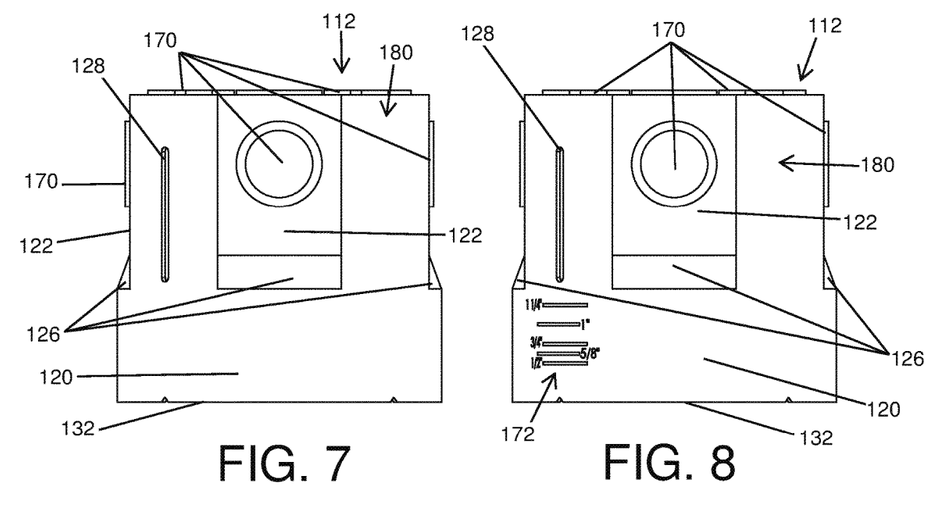
FIG. 7 shows a right side view of the box of FIG. 1.
FIG. 8 shows a left side view of the box of FIG. 1.
Figure 9:
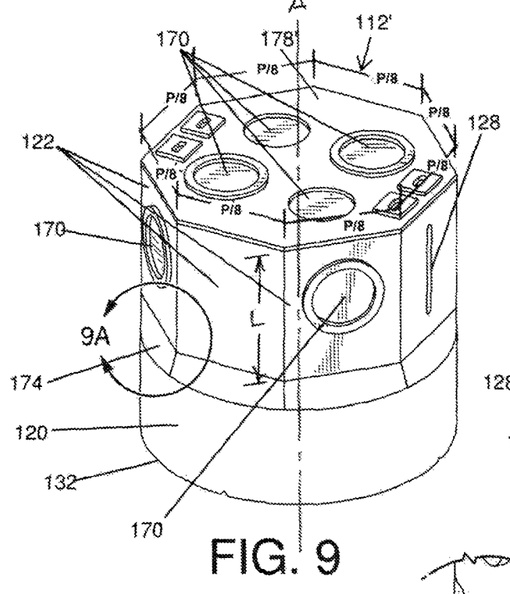
FIG. 9 shows a perspective view of a faceted junction box, according to one embodiment.
Figures 9A, 11, 12:
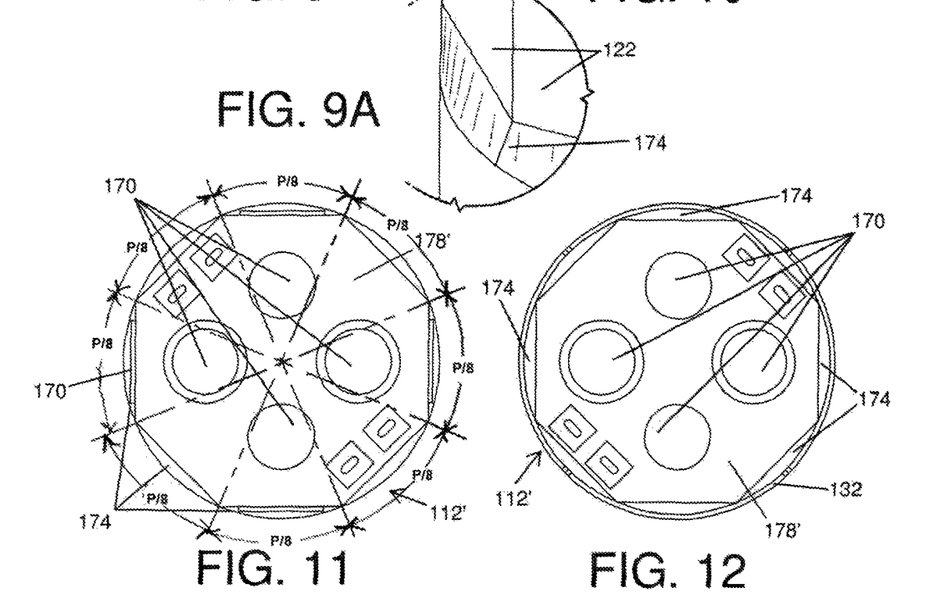
FIG. 9A shows a close-up perspective view of the selection 9A shown in FIG. 9.
FIG. 11 shows a top view of the box of FIG. 9.
FIG. 12 shows a bottom view of the box of FIG. 9.
Figures 17, 18:
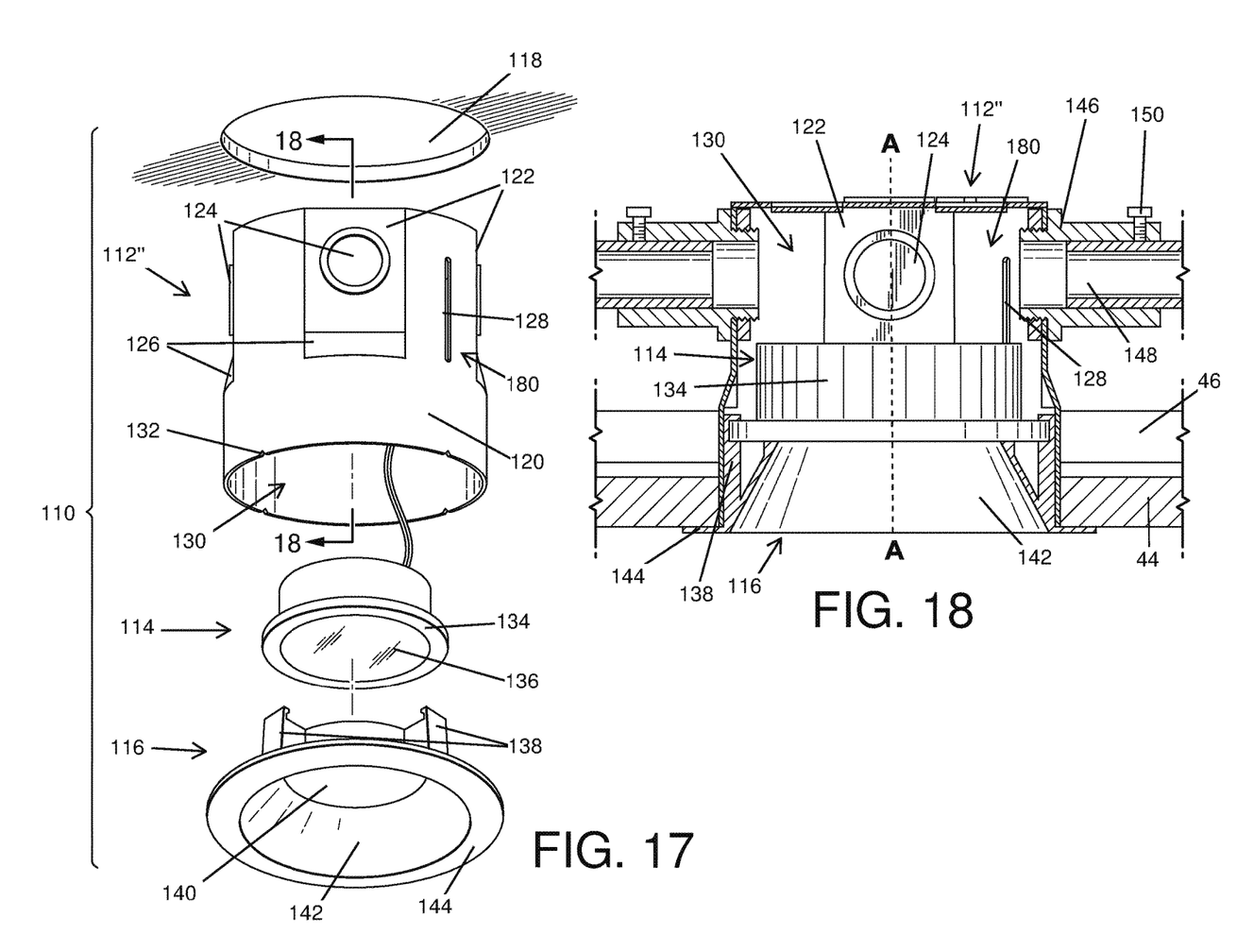
FIG. 17 shows an exploded view of a junction lighting box formed from a partially-faceted junction box, LED light source, and exterior fixture, according to one embodiment.
FIG. 18 shows a cutaway side view of an assembled and installed junction lighting box of FIG. 17, according to one embodiment.

The embodiment shown in FIGS. 1-8 further incorporates blocked knock-out holes 170, and an external length gauge 172 that can be used to measure the depth at which the junction box unit 112 protrudes below the plane any attached optional mounting bracket assembly (see e.g., mounting bracket assembly 152 in FIG. 19). FIG. 1A highlights the canted shape of the sloped indentation 126, in relation to the face 122 and cylindrical body 120, and the presence of a curved segment 180 adjacent to the face 122. From a view showing the cylindrical cavity 130 (see FIG. 2), the sloped indentations 126 and facets 122 project inwardly toward the center of the cavity 130. The external length gauge 172 is shown here as utilizing imperial units, with hash marks set at ½", ⅝", ¾", 1", and 1½" distances from the circular edge 132. As described above, the length gauge 172 is used to align the junction lighting box unit 112 with the outer surface of a circular cutout 118 (FIG. 17). Given the varying thicknesses of installation surfaces, and degrees to which the box unit 112 protrudes from the cutout 118 (FIG. 17), the length gauge 172 can be used as a guide to help immovably secure the box unit 112 to the mounting bracket assembly 152 (FIG. 19) at the correct position, without needing to approximate a set position or visually inspect the installation from both sides. In alternative embodiment, the gauge 172 is laid out in metric units. In a further alternative embodiment, the gauge 172 may employ any number of hash marks, extending axially along the cylindrical body 120 away from the notched circular edge 132. In another alternative embodiment, the junction box unit 112 does not include the pair of bracket positioning slots 128 or blocked knock-out holes 170.

Figure 10:
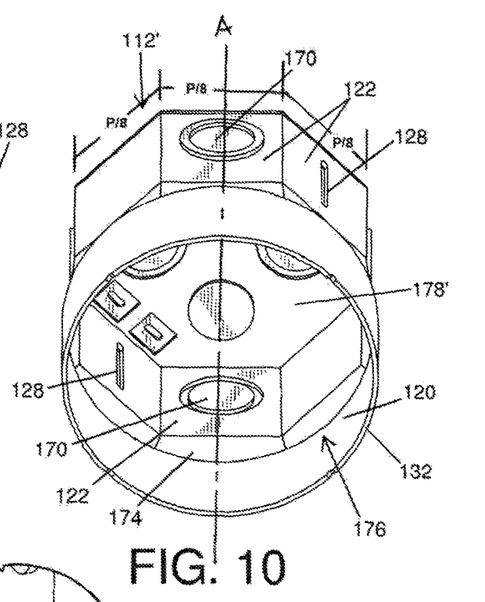
FIG. 10 shows a bottom perspective view of the box of FIG. 9.
Figure 13:
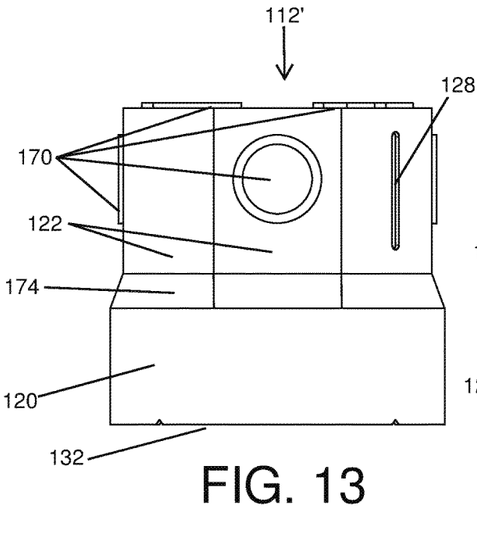
FIG. 13 shows a front view of the box of FIG. 9.
Figure 14:
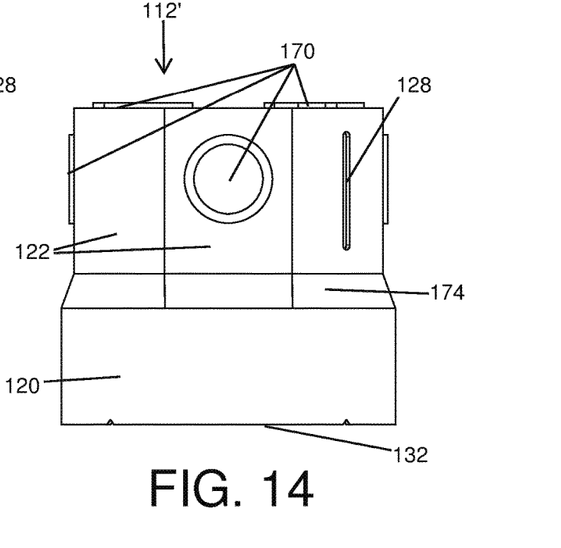
FIG. 14 shows a rear view of the box of FIG. 9.
Figure 15:
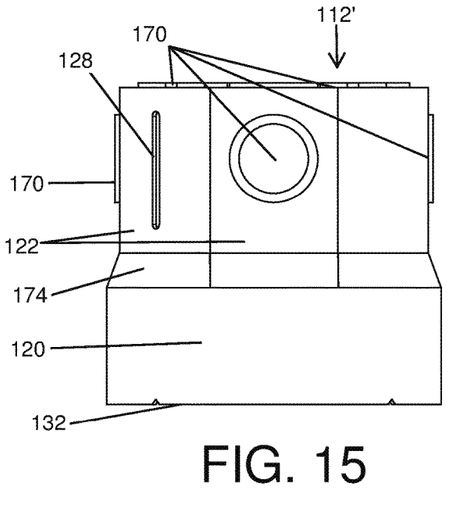
FIG. 15 shows a right side view of the box of FIG. 9.
Figure 16:
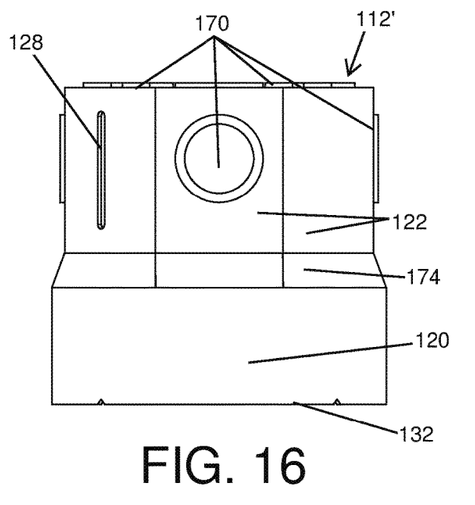
FIG. 16 shows a left side view of the box of FIG. 9.

FIGS. 9-16 show an alternative embodiment of a junction lighting box unit 112', which incorporates blocked knock-out holes 170, an upper portion with eight flat inset facets 122 each occupying the adjacent octagonal peripheral portions P/8, a pair of bracket positioning slots 128 cut into a pair of non-adjacent directly-opposing facets 122, and a curved belt transition 174 joining the eight flat inset facets 122 with the lower cylindrical body 120. FIG. 9A highlights the angled conical frustum shape of the curved belt transition 174, which smoothly joins each facet 122 with the cylindrical body 120. In an alternative embodiment, the curved transition 174 is at least partially concave relative to the internal cavity 176. In another alternative embodiment, the curved transition 174 is at least partially convex relative to the internal cavity 176. FIG. 10 provides an angled perspective view of the internal cylindrical cavity 176, and the way the curved belt transition 174 and facets 122 project inwardly toward the center of the internal cavity 176. The inward projection into the cavity 176 results in the upper portion of the semi-cylindrical junction box unit 112' having a smaller average width than the diameter of the lower cylindrical body 120, thus allowing for easier insertion into a circular cutout 118 (FIG. 17). In this alternative embodiment, the pair of bracket positioning slots 128 are positioned on directly-opposing facets 122, which necessarily results in an attached pair of sliding box brackets (see e.g., sliding box bracket 154 in FIG. 19) being adapted to slide along a flat inset surface. In another alternative embodiment, the junction lighting box unit 112' does not include bracket positioning slots 128 or blocked knock-out holes 170.

Therefore, as shown in FIGS. 1-16 and described above, the junction lighting box units 112 and 112' each include a cylindrical body 120 with a circular bottom edge 132 and closed top 178. Each includes at least one flat inset facet 122 extending from a closed top 178, which interrupts the cylindrical shape, and where the flat inset facet 122 extends downward from the closed top 178 and contains a conventional flat knock-out hole 124. The at least one flat inset facet 122 has a height down from the closed top 178 sufficient to accommodate the threaded branch-through connector 146 (FIG. 18) and electrical conduit 148 (FIG. 18). Thus, the junction lighting box unit 112 generally includes a periphery nearest the closed top 178 having the eight octagonal peripheral portions that may be occupied either by a flat inset facet 122 or a curved segment 180 of the body 120. In an embodiment where only a single flat inset facet 122 is present occupying a single octagonal peripheral portion P/8, the remaining seven octagonal peripheral portions P/8 would be a contiguous curved segments 180 that form the body 120. In the embodiments that include four flat inset facets 122 (FIGS. 1-8), each facet 122 is set adjacent to a curved segment 180 to total eight peripheral octagonal portions P/8. In the embodiment that includes eight flat inset facets 122 (FIGS. 9-16), all of the eight peripheral octagonal portions P/8 are formed as flat inset facets 122, thus providing an octagonal cross-section and octagonal closed top 178'.

As described above, each flat inset facet 122 must be tall enough to afford the use of knock-out holes 124 that allow for the clamping of electrical wiring in place. It is understood that a distance around the knock-out 124 of at least about ¼ inch is so required. For example, in the case of a junction lighting box unit 112 having about a four-inch total height, the height of each flat inset facet 122 should be in a range of from ⅓ to ½ the value of the total height of the body 120. These distances are approximations used to afford the clearance needed by each knock-out hole 124, threaded branch-through connector 146, and electrical conduit 148. If the diameter of the cylindrical body 120 is for example 4⅛ inches, then each flat inset facet 122 and curved segment 180 will be about 1⅝ inches wide.

FIGS. 17 and 18 show an embodiment of the junction lighting box assembly 110 (having axis A) that includes an alternative semi-cylindrical junction lighting box unit 112", light emitter 114, and surface fixture 116. The light emitter 114 includes an emitter housing 134 and protective lens 136, while the surface fixture 116 includes a set of latches 138 that secure the light emitter 114 within the junction lighting box 110 by selectively grabbing onto the emitter housing 134 while simultaneously pressing outward on the interior surface of the cylindrical cavity 130 when fully assembled, an emitter opening 140, a curved conical reflector 142 used to direct emitted light away from the junction lighting box 110, and an annular surface lip 144 that hides the fitting of the circular cutout 118 and the cylindrical body 120 of the junction lighting box 110. The annular surface lip 144 may alternatively be omitted. In an alternative embodiment, the light emitter 114 may incorporate multiple emitter housings 134, each with at least one protective lens 136. In another embodiment, the surface fixture 116 may include a polygonal or elliptical emitter opening (not shown) and corresponding angular or curved reflector (not shown).

FIG. 18 also shows the insertion of a pair of threaded through-branch connectors 146 into two knock-out holes 124 formed on the facets 122 of the junction lighting box unit 112. The connectors 146 are each secured to electrical conduits 148 via a clamp screw 150, although the conduits 148 in this embodiment do not contain wiring (not shown). These connectors 146 and conduits 148 are typically formed from cast aluminum, but may alternatively be formed from any other durable and fire-rated polymer or metallic substance. Examples of the connectors 146 are conventional Flexible Metal Conduit (FMC) conduit fittings and Electrical Metal Tube (EMT) conduit fittings available from Eaton Corp. of Cleveland, Ohio.

Figure 19:
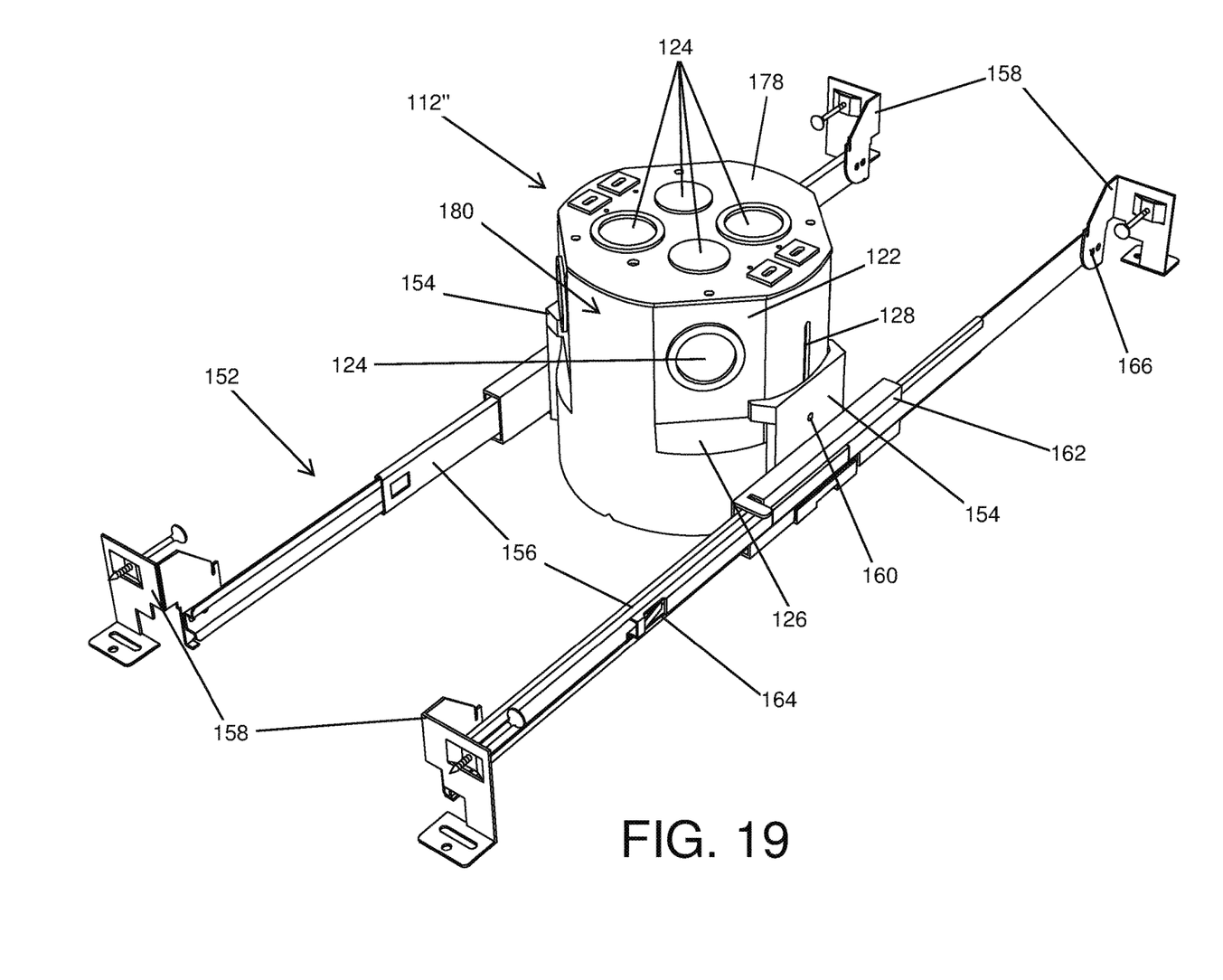
FIG. 19 shows a perspective view of a partially-faceted junction box and attached to an adjustable mounting assembly, according to one embodiment.
Figure 20:
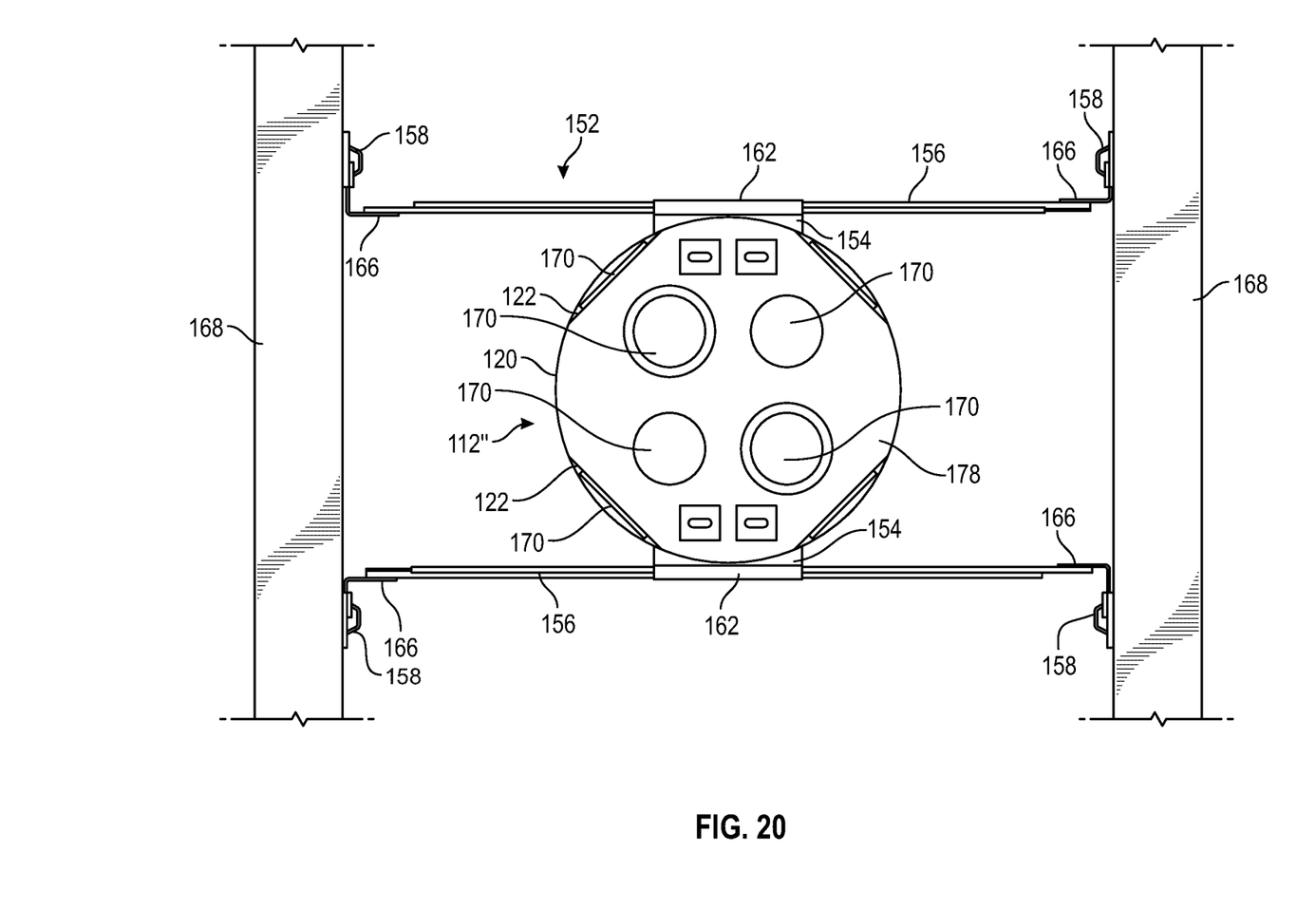
FIG. 20 shows a top view of the junction box and the adjustable mounting assembly of FIG. 19.

FIGS. 19 and 20 show the semi-cylindrical junction lighting box unit 112", attached to a mounting bracket assembly 152. The assembly 152 includes a pair of sliding box brackets 154 that mount to the pair of bracket positioning slots 128 found on the cylindrical body 130 of the box unit 112", and a pair of telescoping sliding rails 156 each terminating in two selectively-rotatable attachment brackets 158. The sliding box brackets 154 include a flat inset outwardly-facing side and a rounded box-facing side contoured to closely engage the pair of curved outer portions of the cylindrical body 120 that each include a bracket positioning slot 128. The curve of the inner surface of each sliding box bracket 154 ensures that the junction box unit 112" remains laterally and rotationally fixed, while a set screw 160—passing through each bracket 154 and into each slot 128—ensures that the unit 112 remains fixed at a single height. Loosening, but not removing the set screw 160, allows the junction lighting box unit 112 to slide along its height, while tightening the screw 160 locks the unit 112 at a set position. The position of the box unit 112, relative to the assembly 152 and/or circular ceiling cutout 118 may be determined by referring to an external length gauge 172 (FIGS. 1-8), printed on the body 120 of the unit 112. The pair of telescoping sliding rails 156 include a lateral c-bracket 162 that fixes the pair of telescoping rails 156 to the pair of sliding box brackets 154. Locking tabs 164 fix the length of each rail 156, while selectively-rotatable joints 166 join the rails 156 to the selectively-rotatable attachment brackets 158. Examples of the rails 156 are conventional Interlocking Adjustable Mounting Bars (Model #26UBH) available from Pathway Lighting Products, Inc., of Old Saybrook, Conn.

FIGS. 19 and 20 show the semi-cylindrical junction lighting box unit 112", attached to a mounting bracket assembly 152. The assembly 152 includes a pair of sliding box brackets 154 that mount to the pair of bracket positioning slots 128 found on the cylindrical body 130 of the box unit 112", and a pair of telescoping sliding rails 156 each terminating in two selectively-rotatable attachment brackets 158. The sliding box brackets 154 include a flat inset outwardly-facing side and a rounded box-facing side contoured to closely engage the pair of curved outer portions of the cylindrical body 120 that each include a bracket positioning slot 128. The curve of the inner surface of each sliding box bracket 154 ensures that the junction box unit 112" remains laterally and rotationally fixed, while a set screw 160—passing through each bracket 154 and into each slot 128—ensures that the unit 112 remains fixed at a single height. Loosening, but not removing the set screw 160, allows the junction lighting box unit 112 to slide along its height, while tightening the screw 160 locks the unit 112 at a set position. The position of the box unit 112, relative to the assembly 152 and/or circular ceiling cutout 118 may be determined by referring to an external length gauge 172 (FIGS. 1-8), printed on the body 120 of the unit 112. The pair of telescoping sliding rails 156 include a lateral c-bracket 162 that fixes the pair of telescoping rails 156 to the pair of sliding box brackets 154. Locking tabs 164 fix the length of each rail 156, while selectively-rotatable joints 166 join the rails 156 to the selectively-rotatable attachment brackets 158. Exemplary of the rails 156 are conventional Interlocking Adjustable Mounting Bars (Model #26UBH) available from Pathway Lighting Products, Inc., of Old Saybrook, Conn.

As seen specifically in FIG. 20, the selectively-rotatable attachment brackets 158 couple to support struts 168, such that a box unit 112 as described in FIGS. 1-8 can be suspended equidistantly between them. Alternatively, the mounting bracket assembly 152 may be used to securely fasten the junction lighting box unit 112" to support struts 168 in a variety of spacing and rotational configurations. The mounting bracket assembly 152 is constructed of a metallic material, but may alternatively be constructed from a durable polymer capable of supporting the weight of a complete junction lighting box 110. In the present embodiment, the junction lighting box unit 112" acts as a recessed housing with all electrical components and connections easily accessible via the removal of the light-emitter 114 and surface fixture 116. In an alternative embodiment, the junction lighting box unit 112" may be mounted to supporting brackets (not shown) that causes the unit 112" to protrude through the cutout 118 (FIG. 17) when fully installed.

To install the junction lighting box 110 (FIGS. 17-18) and mounting bracket assembly 152 (FIGS. 19-20), a user must first cut the circular hole 118 in a desired surface, and then insert the junction lighting box unit 112" through the circular hole 118. Next, the junction lighting box unit 112" must be attached to the mounting assembly 152, and the mounting assembly 152 connected to a fixed anchoring point, which may or may not include surface around the circular hole 118 or a separate support strut 168. The user must then set the mounting depth of the junction lighting box unit 112", fixing its position relative to the mounting assembly 152, and finally install the light emitter 114 and surface fixture 116 within the set junction lighting box unit 112".

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A lighting assembly comprising:
    a lighting module configured to emit light;
    a junction lighting box unit configured to house the lighting module and configured to be substantially recessed behind a surface-hole of a surface, wherein the junction lighting box unit comprises:
        a closed top, an upper portion, a lower portion, and a circular bottom opening, wherein the closed top is disposed opposite of the circular bottom opening, wherein the closed top connects to the upper portion, the upper portion connects to the lower portion, and the lower portion terminates at the circular bottom opening, wherein the upper portion and the lower portion form a sidewall of the junction lighting box unit, wherein the closed top and the side wall bound an interior cavity, wherein the interior cavity removably houses the lighting module, wherein the lower portion is substantially cylindrical in shape, wherein an outer periphery of the upper portion either (a) alternates between first flat inset facets and curved portions such that each first flat inset facet is bounded on both sides by at least some of the curved portions or (b) is a plurality second flat inset facets that are all equally sized and without the curved portions, wherein a curvature of the lower portion and a curvature of the curved portions are the same, wherein the first flat inset facets or the second flat inset facets are parallel with respect to an axial direction from the closed top to the circular bottom opening;
    wherein the junction lighting box unit further comprises at least one conduit-receiving-hole sized and configured to receive a portion of electrical conduit, wherein the at least one conduit-receiving-hole is located on one of the flat inset facets selected from the first flat inset facets or selected from the second flat inset facets;
    wherein the junction lighting box unit optionally comprises at least one knock-out cover member, wherein the at least one knock-out cover member is removable and when present is located, sized, and configured to block the at least one conduit-receiving-hole until the portion of the electrical conduit is to be attached to the at least one conduit-receiving-hole;
    wherein the junction lighting box unit further comprises sloped transitions that are transitions from the first flat inset facets or from the second flat inset facets transitioning to the lower portion that is curved, wherein the sloped transitions are neither parallel nor orthogonal to the axial direction;
    wherein the closed top, the upper portion, the lower portion, and the circular bottom opening are all integral with each other all being of a single article of manufacture.

2. The lighting assembly according to claim 1, wherein the outer periphery of the upper portion is comprised of eight peripheral portions that are either configured as four of the first flat inset facets and four of the curved portions that alternate or configured as eight of the plurality of second flat inset facets.

3. The lighting assembly according to claim 1, wherein around an entirety of the at least one conduit-receiving-hole is a flat planar region of a predetermined distance, wherein this flat planar region is parallel with the axial direction, wherein this predetermined distance is sufficient to facilitate clamping of the portion of the electrical conduit to the at least one conduit-receiving-hole.

4. The lighting assembly according to claim 1, wherein with respect to a total length of the junction box unit from the closed top to the circular bottom, the first flat inset facets or the second flat inset facets have fixed lengths that are from one third to one half of the total length and the lower portion, with the sloped transitions, has a fixed length of two thirds to one half of the total length, respectively.

5. The lighting assembly according to claim 1, wherein the first flat inset facets or the second flat inset facets extend in the axial direction from the closed top but do not fully extend to the circular bottom opening.

6. The lighting assembly according to claim 1, wherein the junction lighting box unit is fire-rated.

7. The lighting assembly according to claim 1, wherein the closed top comprises at least one second conduit-receiving-hole that is sized and configured to receive a portion of other electrical conduit.

8. The lighting assembly according to claim 7, wherein the closed top further comprises at least one second knock-out cover member, wherein the at least one second knock-out cover member is removable and when present is located, sized, and configured to block the at least one second conduit-receiving-hole until the portion of the other electrical conduit is to be attached to the at least one second conduit-receiving-hole.

9. The lighting assembly according to claim 1, wherein the junction lighting box unit further includes a pair of oppositely located bracket positioning slots extending in the axial direction of the junction lighting box unit.

10. The lighting assembly according to claim 9, wherein the lighting assembly further comprises a mounting bracket assembly having:
    a pair of sliding brackets with each of the pair of sliding brackets coupled to each of the pair of bracket positioning slots, and adapted for being fixed at a selected position along the pair of bracket positioning slots;
    a pair of rails with each of the pair of rails coupled to each of the pair of sliding brackets, and capable of telescopically expanding or contracting in two opposing directions relative to the pair of sliding brackets; and
    rotatable attachment brackets with each of the rotatable attachment brackets coupled to each terminal end of each of the pair of rails, wherein the rotatable attachment brackets are selectively rotatable to allow for angular mounting of the pair of rails to supporting structures.

11. The lighting assembly according to claim 1, wherein the lighting assembly further comprises an exterior surface fixture having at least one selectively-clasping latch for securing the lighting module within the junction lighting box unit through press-fit engagement of the at least one selectively-clasping latch between the lighting module and an interior surface of the junction lighting box unit.

12. The lighting assembly according to claim 11, wherein the exterior surface fixture includes an annular lip for concealing the surface-hole in the surface when the junction lighting box unit is inserted into the surface-hole of the surface.

13. The lighting assembly according to claim 11, wherein the exterior surface fixture includes a conical frustum reflector to direct at least some luminous emission away from the junction lighting box unit.

14. A lighting assembly, comprising:
   a junction box configured for housing a light emitter and configured to be substantially recessed behind a surface-hole of a surface, wherein the junction box comprises:
      a closed end, a circular open end, and a sidewall, wherein the closed end is disposed opposite of the circular open end, wherein the closed end connects to the sidewall that then the sidewall terminates at the circular open end, wherein the closed end and the sidewall bound an interior cavity that is sized and configured to house the light emitter, wherein the circular open end provides access to the interior cavity, wherein the sidewall is parallel with an axial direction running from the closed end to the circular open end, wherein the sidewall is comprised of an upper portion and a lower portion, wherein the lower portion is cylindrically shaped, wherein an outer periphery of the upper portion either (a) alternates between first flat inset facets and curved portions such that each of the first flat inset facets is bound on both sides by at least some of the curved portions, or (b) is a plurality of second flat inset facets that are all equally sized and without the curved portions, wherein the upper portion comprises a pair of slots that are parallel with the axial direction;
      wherein the junction box further comprises sloped transitions that are transitions from the first flat inset facets or from the second flat inset facets transitioning to the lower portion that is curved, wherein the sloped transitions are neither parallel nor orthogonal to the axial direction; and
   a mounting assembly configured for mounting the junction box to a support structure, wherein the mounting assembly comprises:
      a pair of slidable brackets with each of the pair of slidable brackets selectively coupled to each of the pair of slots of the upper portion and capable of sliding in the axial direction relative to the junction box;
      a pair of slide rails with each of the pair of slide rails coupled to each of the pair of slidable brackets, and capable of moving in two opposing directions relative to the pair of slidable brackets; and
      four rotatable couplers with each of the four rotatable couplers fixed to each terminal end of the pair of slide rails, wherein the four rotatable couplers are selectively pivotable to allow for selectable mounting of the pair of slide rails to the support structure.

15. The lighting assembly according to claim 14, wherein the junction box includes at least one knock-out hole sized and configured to receive a portion of electrical conduit.

16. The lighting assembly according to claim 14, wherein the circular open end is notched.

17. The lighting assembly according to claim 14, wherein the sidewall includes an external length gauge that is a set of measured and predetermined hash marks on an exterior of the sidewall.

18. The lighting assembly according to claim 14, wherein the junction box is fire-rated.

19. A method for installing in a structure that has an exterior surface a recessed lighting assembly that includes a junction lighting box unit, a lighting module, and a mounting assembly, wherein the method comprises steps of:
   (a) cutting a circular hole in the structure defining an opening for lighting projection;
   (b) positioning the junction lighting box unit for lighting projection through the circular hole;
   (c) connecting the mounting assembly to the junction lighting box unit;
   (d) connecting the mounting assembly to a support-strut located behind and proximate to the exterior surface of the structure or connecting the mounting assembly to the structure;
   (e) setting a mounting depth of the junction lighting box unit with respect to the exterior surface of the structure; and
   (f) installing the lighting module within the junction lighting box unit;
   wherein the junction lighting box unit comprises:
      a closed end, a circular open end, and a sidewall, wherein the closed end is disposed opposite of the circular open end, wherein the closed end connects to the sidewall that then terminates at the circular open end, wherein the closed end and the sidewall bound an interior cavity configured for receiving the lighting module, wherein the circular open end provides access to the interior cavity, wherein the sidewall is parallel with an axial direction running from the closed end to the circular open end, wherein the sidewall is comprised of an upper portion and a lower portion, wherein the lower portion is cylindrically shaped, wherein an outer periphery of the upper portion either (i) alternates between first flat inset facets and curved portions such that each of the first flat inset facets is bound on both sides by at least some of the curved portions, or (ii) is a plurality of second flat inset facets that are all equally sized and without the curved portions, wherein the upper portion comprises slots that are parallel with the axial direction, wherein the slots are removably connected to the mounting assembly in the step (c); and
   wherein the junction lighting box unit further comprises sloped transitions that are transitions from the first flat inset facets or from the second flat inset facets transitioning to the lower portion that is curved, wherein the sloped transitions are neither parallel nor orthogonal to the axial direction.

20. The method according to claim 19, wherein the structure is a ceiling.

21. The method according to claim 19, wherein the sidewall comprises an external length gauge that is a set of measured and predetermined hash marks located on an exterior of the sidewall used at least in part to facilitate the step (e).

22. The method according to claim 19, wherein the mounting assembly comprises:
   a pair of slidable brackets selectively coupled to the slots of the upper portion and capable of sliding relative to the junction lighting box unit in the axial direction;

a pair of slide rails with each of the pair of slide rails coupled to each of the pair of slidable brackets, and capable of moving in two opposite directions relative to the pair of slidable brackets; and four rotatable couplers with each of the four rotatable couplers fixed to each terminal end of the pair of slide rails, wherein the four rotatable couplers are selectively pivotable to allow for selectable mounting of the pair of slide rails to the support-strut or to the structure according to the step (d).

* * * * *